Dec. 19, 1950     E. W. PROUT     2,534,477

PRESSURE SEALING MEANS FOR VALVES

Filed March 4, 1946

Inventor
Elmer W Prout
By Lyon & Lyon
Attorneys

Patented Dec. 19, 1950

2,534,477

UNITED STATES PATENT OFFICE 2,534,477

PRESSURE SEALING MEANS FOR VALVES

Elmer W. Prout, La Canada, Calif., assignor, by mesne assignments, to Thompson W. Burnam, Aletha K. Burnam, Ann Burnam, John C. Burnam, and Julia B. Crews, trading as a limited partnership under the name Fog Nozzle Company Application March 4, 1946, Serial No. 651,825

3 Claims. (Cl. 251—113)

My invention relates to pressure sealing means for valves and among the objects of my invention are:

First, to provide a pressure sealing means which is particularly adapted for use in valves wherein a cylindrical or valve core is rotatably mounted in a valve body, or in other cases wherein a seal between the mating surfaces of the moving and fixed parts of a valve require clearance for ease of operation.

Second, to provide a pressure sealing means which when mounted in the discharge passages of a valve is subjected to pressure from the intake side thereof and utilizes such pressure to exert a force tending to maintain a tight seal.

Third, to provide a pressure sealing means wherein the effective sealing pressure is at maximum when the valve is shut off and is reduced when the valve is partly or fully open so that in open and throttling positions of the valve a minimum of effort is required to overcome the frictional forces incidental to the sealing pressure.

Fourth, to provide a pressure sealing means wherein metal-to-metal contact may be had between the wearing elements of the valve and which is capable of substantial wear before replacement is required.

Fifth, to provide a pressure sealing means which is applicable to both extremely high as well as moderate or low pressure conditions and which is particularly useful in conjunction with the control valves of fire-fighting nozzles, particularly multiple port fire-fighting nozzles.

With the above and other objects in view as may appear hereinafter reference is directed to the accompanying drawings, in which.

Figure 1:
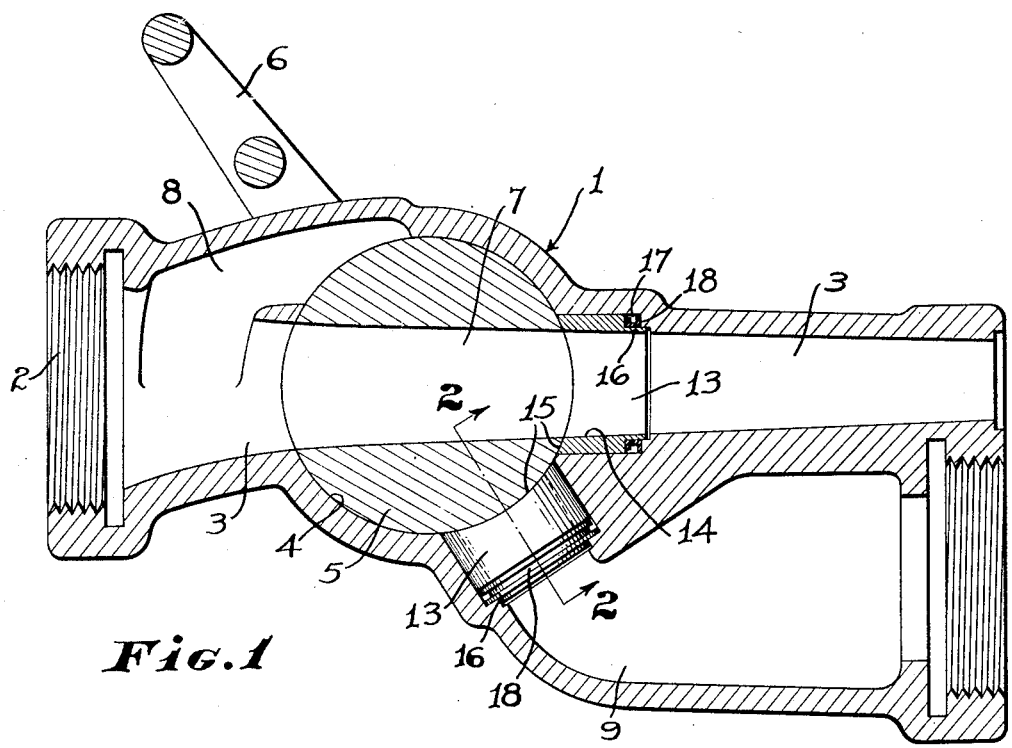
Fig. 1 is a longitudinal sectional view through a multiple nozzle fire-fighting valve controlled nozzle head, showing two of my sealing means incorporated therein, one being shown in section and disposed in open position, the other being shown in elevation and in a closed passageway.

While my pressure sealing means is applicable to various types of valves, it has particular application to fire-fighting nozzle structures. Accordingly, then, my sealing means is shown in conjunction with one type of a fire-fighting nozzle structure.

The nozzle structure includes a body 1 having internally threaded base end 2 for connection to a fire hose and a main nozzle bore 3 extending axially therefrom. The nozzle bore preferably tapers in venturi form from the threaded base end to its extended or discharge end. Near its base end the main nozzle bore is intersected transversely by a valve rotor chamber 4, which is preferably cylindrical and substantially larger in diameter than the main nozzle bore. The chamber 4 receives a cylindrical valve rotor 5, which is adapted to be rotated in the chamber 4 by means of a suitable handle 6. The valve rotor is provided with a passage 7 adapted to align coaxially with the nozzle bore 3. The passage 7 preferably tapers and is so proportioned that its walls form continuations of the walls of the main nozzle bore 3.

The valve body is provided with a lateral passage 8 extending from the intake end of the main nozzle bore to a point arcuately displaced therefrom about the surface of the valve rotor chamber 4. Diametrically opposite the intersection of the passage 8 with the chamber 4 is located a discharge passage 9 which curves into parallel relation with the main nozzle bore 3 and terminates in suitable internally threaded counterbore, which is adapted to receive various fog nozzles (not shown).

The valve rotor may be moved so that the water is discharged either from the main nozzle or through the fog nozzle.

It will be observed that the valve rotor 5 is necessarily relatively large. It also will be observed that it is preferably cylindrical and should be so fitted that it may be easily rotated. In order to do this, however, the problem of effecting a complete seal of the nozzles when the rotor is in its "off" position becomes extremely difficult. It is for the purpose of effecting such a seal that I employ my sealing means.

The main nozzle bore 3 confronting the discharge end of the valve rotor passage 7 is counterbored as indicated by 11. The discharge passage 9 is similarly counterbored. The shoulder formed by the extended end of the counterbore is preferably stepped as indicated by 12. Slidably and relatively loosely fitted in the counterbore 11 is a floating ring 13 having a bore 14 conforming to the nozzle bore 3 or the discharge passage 9, as the case may be. These passages, of course, may be identical so that the floating rings may be interchangeable.

The axial end of the floating ring 13 is shaped to conform to the cylindrical surface of the valve rotor 5 and forms a sealing surface 15. The other axial end of the floating ring 13 is provided with a lip 16 continuing axially therefrom into the step 12. A shoulder is formed at the base end of the lip 16 which is spaced from the shoulder formed by the counterbore 11. The two shoulders define the axial ends of an annular sealing ring cavity 17.

A sealing ring 18 of resilient material fits in the cavity 17. The sealing ring is preferably channel shaped in cross section with the base of the channel constituting its inner periphery and its flanges 19 and 20 directed radially outwardly. The flange 19 bears against the shoulder forming the end of the floating ring 13, whereas the other flange fits against the shoulder formed by the near end of the counterbore 11.

Figure 2:
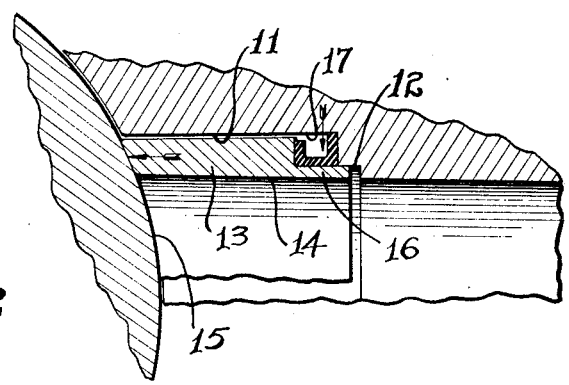
Fig. 2 is an enlarged fragmentary sectional view through 2—2 of Fig. 1 showing the conditions which obtain when the valve is closed.

Sufficient clearance is afforded between the floating ring 13, as well as between the valve rotor 5 and its chamber 4 that line pressure exerted when the valve is closed maintains the chamber 17 full of liquid so that the force of the liquid is exerted axially on the two end flanges 19 and 20, thus urging the floating ring 13 in the direction of the arrow as shown in Fig. 2; that is, toward the rotor, with sufficient force to effect a seal.

When the valve is in open or throttled position, the high velocity flow through the nozzle lowers the pressure in the cavity 17 so that the sealing force exerted by the floating ring 13 is reduced, and the valve may be turned freely.

Having fully described my invention, it is to be understood that I do not wish to be limited to the details herein set forth, but my invention is of the full scope of the appended claims.

I claim:

1. The combination with a valve body having a fluid course intersected by a valve chamber, the fluid course being counterbored in a region confronting said valve chamber and a valve member movable in said valve chamber, of a sealing means comprising: a hollow cylindrical member slidable in said counterbore, one end of said member being shaped into conformity with said valve member, the other end having an axially extending lip and defining with the base end of said counterbore an annular pressure cavity said lip extending beyond said counterbore into said fluid course; a seal means lining said cavity to isolate said cavity from said fluid course, said cylindrical member having a sufficiently loose fit that pressure applied to fluid disposed between said valve member and the walls of the valve chamber may be transmitted through fluid around the exterior of said cylindrical member to said pressure cavity, said cylindrical member adapted, when subjected to pressure in said pressure cavity to sealingly engage said valve member.

2. The combination with a valve body having a fluid course intersected by a valve chamber, the fluid course being counterbored in a region confronting said valve chamber and a valve member movable in said valve chamber, of a sealing means, comprising: a tubular member slidable in said counterbore and having an axially directed lip cooperating with the walls of the fluid course adjacent said counterbore to define the radially inner wall of an annular pressure cavity separated from the fluid course, said tubular member having a pressure area confronting the base end of said counterbore and defining therewith the end walls of said cavity; an annular sealing member of channel shaped section fitting said lip and sealing against said end walls; said tubular member loosely fitting said counterbore whereby said pressure cavity may be subjectd to fluid pressure transmitted from said valve chamber, and said tubular member urged by pressure in said cavity into sealing engagement with said valve member.

3. A valve structure, comprising: a valve body defining a fluid passage, a valve chamber intersected by said passage, and a counterbore in said passage confronting said valve chamber; a valve element rotatable in said valve chamber and having a port adapted to communicate with said fluid passage; a tubular sealing member slidable in and guided by said counterbore, one end of said sealing member being shaped for sealing engagement with said valve element, the other end having a pressure face confronting the base end of said counterbore, said pressure face having an integral axially extending lip adapted to telescope within said fluid passage to form with said pressure face and base end of the counterbore an annular pressure chamber, said counterbore and sealing member defining a pressure passageway in communication with said chamber; and a channel shaped sealing ring having a flange overlying the pressure face of said tubular sealing member but permitting flow between said pressure passageway and said pressure chamber, and a flange sealing between said lip and the base end of said counterbore, said tubular sealing member adapted to be urged into sealing engagement with said valve element by pressure in said pressure chamber.

ELMER W. PROUT.

REFERENCES CITED

The following references are of record in the file of this patent:

UNITED STATES PATENTS

| Number | Name | Date |
|---|---|---|
| 2,030,458 | McKellar | Feb. 11, 1936 |
| 2,191,232 | Heinen | Feb. 20, 1940 |

FOREIGN PATENTS

| Number | Country | Date |
|---|---|---|
| 131,734 | Switzerland | Feb. 28, 1929 |
| 268,833 | Italy | Oct. 30, 1929 |